(12) United States Patent
Kraus et al.

(10) Patent No.: US 11,519,602 B2
(45) Date of Patent: Dec. 6, 2022

(54) PROCESSES AND SYSTEMS FOR ANALYZING IMAGES OF A FLARE BURNER

(71) Applicant: Honeywell International Inc., Morristown, NJ (US)

(72) Inventors: Kurt Edward Kraus, Tulsa, OK (US); Matthew Martin, Tulsa, OK (US); Tobias Nebel, North Vancouver (CA); Michael Kon Yew Hughes, Vancouver (CA); Frank M. Haran, Quebec (CA); Sebastien Tixier, North Vancouver (CA); James W. Harris, Palatine, IL (US)

(73) Assignee: Honeywell International Inc., Charlotte, NC (US)

( * ) Notice: Subject to any disclaimer, the term of this patent is extended or adjusted under 35 U.S.C. 154(b) by 259 days.

(21) Appl. No.: 16/892,769

(22) Filed: Jun. 4, 2020

(65) Prior Publication Data

US 2020/0386404 A1     Dec. 10, 2020

Related U.S. Application Data

(60) Provisional application No. 62/858,707, filed on Jun. 7, 2019.

(51) Int. Cl.
  *F23N 5/00* (2006.01)
  *F23N 5/16* (2006.01)
  (Continued)

(52) U.S. Cl.
  CPC .............. *F23N 5/003* (2013.01); *F23N 5/16* (2013.01); *G06V 10/22* (2022.01); *G06V 10/56* (2022.01);
  (Continued)

(58) Field of Classification Search
  CPC ............ F23N 5/003; F23N 5/16; G06V 10/22
  (Continued)

(56) References Cited

U.S. PATENT DOCUMENTS

| 6,318,891 B1 | 11/2001 | Haffner et al. |
| 7,505,608 B2 | 3/2009 | Portigal et al. |

(Continued)

FOREIGN PATENT DOCUMENTS

| EP | 2309186 A2 | 4/2011 |
| JP | 4266535 B2 | 9/2001 |

(Continued)

OTHER PUBLICATIONS

International Search report from corresponding PCT application No. PCT/US2020/036169 dated Sep. 3, 2020.

(Continued)

*Primary Examiner* — Vivek K Shirsat

(57) ABSTRACT

Methods and systems for monitoring a flare burner with a camera. The methods and systems which may indicate to operators the presence or absence of one or more of smoke, flare flame, and steam plume and record those indications or measurements. Additionally, the methods and systems may confirm whether compliance with local regulations on visual emissions, smoke plume is achieved. The methods and systems automatically adjust the delivery rate of key inputs including measures assist fuel gas, purge gas, steam and/or air simultaneously to maintain or attain compliance with said local regulatory requirements. Also, methods for a machine learning process for using controller inputs to identify normal and abnormal flare states and provide visual indications and flare operation recommendations.

19 Claims, 6 Drawing Sheets

(51) Int. Cl.
*G06V 10/22* (2022.01)
*G06V 10/56* (2022.01)
*F23G 7/08* (2006.01)

(52) U.S. Cl.
CPC ........ *F23G 7/085* (2013.01); *F23G 2209/141* (2013.01); *F23N 2225/10* (2020.01); *F23N 2241/18* (2020.01)

(58) Field of Classification Search
USPC .................................................. 431/14, 202
See application file for complete search history.

(56) References Cited

U.S. PATENT DOCUMENTS

| | | | |
|---|---|---|---|
| 7,687,776 | B2 | 3/2010 | Baliga et al. |
| 7,876,229 | B2 | 1/2011 | Rao et al. |
| 8,138,927 | B2 | 3/2012 | Diepenbroek et al. |
| 8,548,271 | B2 | 10/2013 | Grimberg |
| 8,841,617 | B2 | 9/2014 | Cole |
| 9,121,760 | B2 | 9/2015 | Cabib et al. |
| 9,127,891 | B2 | 9/2015 | Au et al. |
| 9,196,032 | B1 | 11/2015 | Kraus et al. |
| 9,212,851 | B2 | 12/2015 | Martin et al. |
| 9,250,135 | B2 | 2/2016 | Cole et al. |
| 9,258,495 | B2 | 2/2016 | Zeng et al. |
| 9,325,915 | B2 | 4/2016 | Zeng et al. |
| 9,562,849 | B2 | 2/2017 | Kester et al. |
| 9,581,543 | B2 | 2/2017 | Cabib et al. |
| 9,587,987 | B2 | 3/2017 | Larsen et al. |
| 9,594,359 | B2 | 3/2017 | Mohideen et al. |
| 9,599,508 | B2 | 3/2017 | Kester et al. |
| 9,625,318 | B2 | 4/2017 | Kester et al. |
| 9,635,284 | B2 | 4/2017 | Benson et al. |
| 9,651,254 | B2 | 5/2017 | Ducharme et al. |
| 9,664,568 | B2 | 5/2017 | Au et al. |
| 9,677,762 | B2 | 6/2017 | Tullos |
| 10,041,672 | B2 | 8/2018 | Zhdaneev |
| 10,043,288 | B2 | 8/2018 | Kraus et al. |
| 2014/0184793 | A1 | 7/2014 | Cole |
| 2014/0336953 | A1* | 11/2014 | Johnson ............... G01N 21/538 702/24 |
| 2015/0355030 | A1 | 12/2015 | Au et al. |
| 2015/0362372 | A1 | 12/2015 | Venkatesha et al. |
| 2016/0088240 | A1 | 3/2016 | Kostrzewa et al. |
| 2016/0097533 | A1 | 4/2016 | Bietto et al. |
| 2016/0097680 | A1 | 4/2016 | Bietto et al. |
| 2016/0116164 | A1* | 4/2016 | Ducharme .............. F23N 5/265 431/14 |
| 2016/0161338 | A1 | 6/2016 | Lavi |
| 2016/0165152 | A1 | 6/2016 | Cabib et al. |
| 2016/0238451 | A1 | 8/2016 | Zeng |
| 2016/0356702 | A1 | 12/2016 | Hinnrichs |
| 2017/0097274 | A1 | 4/2017 | Thorpe et al. |
| 2017/0116499 | A1 | 4/2017 | Tsukada et al. |
| 2017/0148184 | A1 | 5/2017 | Kraus et al. |
| 2017/0370579 | A1 | 12/2017 | Johnson et al. |
| 2018/0266680 | A1 | 9/2018 | Arabi et al. |

FOREIGN PATENT DOCUMENTS

| | | |
|---|---|---|
| WO | 2008/116037 A1 | 9/2008 |
| WO | 2011/086433 A1 | 7/2011 |
| WO | 2011/138766 A1 | 11/2011 |
| WO | 2016/013018 A1 | 1/2016 |
| WO | 2016073537 A1 | 5/2016 |
| WO | 2016138991 A1 | 9/2016 |
| WO | 2016139261 A1 | 9/2016 |
| WO | 2016147169 A1 | 9/2016 |
| WO | 2017009819 A1 | 1/2017 |

OTHER PUBLICATIONS

Written Opinion from corresponding PCT application No. PCT/US2020/036169 completed Aug. 24, 2020.
Vladimir P. Solovjov, et al., "An Efficient Method for Modeling Radiative Transfer in Multicomponent Gas Mixtures with Soot", Journal of Heat Transfer, Jun. 2001, vol. 123, pp. 450-457.
M.R. Johnson, et al., A Generalized Sky-LOSA Method to Quantify Soot/Black Carbon Emission Rates in Atmospheric Plumes of Gas Flares, Aerosol Science and Technology, 47:1017-1029, 2013.
International Preliminary Report on Patentability from corresponding PCT application No. PCT/US2020/036169 dated Dec. 3, 2021.

* cited by examiner

PROCESSES AND SYSTEMS FOR ANALYZING IMAGES OF A FLARE BURNER

RELATED APPLICATIONS

This application claims the benefit of U.S. Provisional Patent Application Ser. No. 62/858,707 filed on Jun. 7, 2019, the entirety of which is incorporated herein by reference.

FIELD OF THE INVENTION

This invention relates generally to processes and systems that analyze images of a flare burner to determine the apparent presence of absence of smoke.

BACKGROUND OF THE INVENTION

In process industries such as petroleum (oil) refineries and petrochemical plants, it is a common practice to burn the exhaust gases of a stage of the refinery or plant before releasing the gases to the atmosphere in order to reduce the environment pollution using a device known as a flare or flare burner in a process known as flaring or flare burning. The flare burner may be a steam-assisted, combustible gas assisted, or air assisted flare burner.

Flaring is commonly used in the petrochemical and oil industry as a combustion process to safely dispose of flammable waste gases produced from normal operations, as well as during, emergency process upsets process start-up, process shutdown, and turnaround operations. Flaring helps prevent the undesired release of the hydrocarbons in the waste gases into the atmosphere. However, combustion of hydrocarbons is seldom 100% complete leading to black smoke (hereafter "smoke") production due to inefficient combustion of the hydrocarbons which can result in significant financial costs including fines from regulatory bodies and costs due to steam and pressurized air usage.

Regulatory authorities (e.g., the U.S. Environmental Protection Agency (EPA)) generally impose environmental regulations in terms of monitoring and controlling smoke. In general smoke reduction has the highest priority, but in locations where the refineries are located relatively close to residential communities, noise reduction can be important too. Failure to adhere to EPA or other regulations can result in the imposition of serious financial penalties and sometimes revoking of operating licenses for the owner of the process.

More specifically, operators must know and record many aspects of flare flame performance or face regulatory sanction and/or fines. Accordingly, the operators may track and record: 1) the presence and absence of smoke, 2) the presence and absence of the flare flame, 3) the flow rate and composition of flare gas, 4) the flow rate and composition of assist fuel gas, purge gas, steam and/or air, 5) calculated values for net heating value at regular intervals in time based on the above listed input parameters, and 6) the time duration of flaring and smoking events. While failure to comply with the recording or performance aspects of flare operation can result in significant fines, operating too conservatively with too much assist fuel gas, purge gas, steam, or air results in excessive operation utility costs. Accordingly, it is desirable to utilize a flare monitoring system.

The main role of a flare monitoring and control device or system is to monitor and measure certain parameters of the flare such as amount/volume of the smoke, size of the flare, and noise level (typically in dB), and take certain countermeasures to control the flare so as to ensure compliance with EPA smoke and noise level regulations. Few flare monitoring and control solutions exist for in-situ and remote sensor-based flare monitoring. For example, systems based on thermocouples, infrared (IR) sensors, or cameras can be used for indicating the presence or absence of smoke and to some extent the quantity of smoke.

However, even with existing products, there is continuing and ongoing need for systems and methods for monitoring a flare burner with a camera.

SUMMARY OF THE INVENTION

One or more methods for monitoring a flare burner with a video camera have been invented which can be used in a system for observing and controlling a flare. In various embodiments, the present invention provides methods and systems which may indicate to operators the presence or absence of one or more of smoke, flare flame, and steam plume and record those indications or measurements. Additionally, the methods and systems may confirm whether compliance with local regulations on visual emissions, smoke plume is achieved. In various aspects and embodiments, the methods and systems automatically adjust the delivery rate of key inputs including assist fuel gas, purge gas, steam, and/or air simultaneously to maintain or attain compliance with said local regulatory requirements.

Therefore, the present invention may be characterized, in at least one aspect, as providing a process for determining an apparent presence or absence of smoke from a flare burner associated with a processing plant by: a) obtaining a visual image of the flare burner and an area surrounding the flare burner; b) analyzing the visual image by segmenting the visual image into a plurality of regions of interest, and, calculating a smoke index for each of the regions of interest based on a historical intensity of a plurality of pixels within each of the regions of interest; c) determining the apparent presence of smoke based on the smoke index for the regions of interest by comparing the smoke index to a threshold smoke index level; and, d) indicating the apparent presence of smoke for the regions of interest when the smoke index is at or above the threshold smoke index level.

The smoke index of the pixels may be calculated by determining an intensity value for one or more pixels in a particular region of interest by subtracting a background intensity value, wherein the background intensity value of each pixel is a maximum intensity value for that pixel from a series of visual images.

The smoke index may be based on an opacity determination. For example, the smoke index of each region of interest is calculated with an equation comprising, $100\% * (1 - INTnow/INTbackground)$, wherein INTnow represents an average intensity value of one or more pixels in a particular region of interest, and wherein INTbackground represents a maximum intensity value for the one or more pixels in the particular region of interest determined from a series of visual images. The series of visual images may be, for example, between 20 to 70 frames preceding the visual image. One of ordinary skill in the art will appreciate and understand that other numbers of previous images may be used, and that the previous images need immediately precede the current image.

It is contemplated that the intensity value may be a color intensity value.

In some embodiments, the regions of interest move in relation to the flare burner. Alternatively, the regions of interest may be static in relation to the flare burner.

The process may also include adjusting at least one process condition of the processing plant based on a difference between the smoke index is at or above the threshold smoke index level and, repeating steps a)-c). The at least one process condition may be adjusted to maintain the smoke index at the predetermined set point. The steps a)-c) may be repeated until the smoke index reaches a predetermined level.

The process may further include calculating a reliability value for each smoke index calculated. Additionally, the process may include increasing a weighting to non-camera based values used for determining the smoke index based on the reliability 3.0 values. It is contemplated that the process includes obtaining a current process condition information of the processing plant and when a number of the calculated smoke indexes with a reliability value above a predetermined level is below a minimum amount, the process includes determining the apparent presence by comparing the current process condition information with a database having process condition data and apparent smoke probability associated with the process condition data. It is further contemplated that the process includes obtaining a current atmospheric condition information at the flare burner; and, when a number of the calculated smoke indexes with a reliability value above a predetermined level is below a minimum amount, the process includes determining the apparent presence by comparing the atmospheric condition information with the database, wherein the database further comprises having atmospheric condition data and apparent smoke probability associated with the atmospheric condition data.

The process may include obtaining an audio signature of the flare burner corresponding to the visual image, and the smoke index for each regions of interest may be calculated based on the audio signature.

The process may include obtaining an UV image of the flare burner corresponding to the visual image, and the smoke index for each regions of interest may be calculated based on the UV image.

The process may include: obtaining a temperature at a predetermined position spaced from the flare burner corresponding to the visual image, comparing the temperature to a threshold temperature, and performing an action when the temperature meets or passes the threshold temperature.

In a second aspect, the present invention may be generally characterized as providing a process for determining an apparent presence or absence of smoke from a flare burner associated with a processing plant by: obtaining a plurality of visual images of the flare burner and an area surrounding the flare burner, wherein the plurality includes an image with no smoke and an image with smoke, and wherein the presence or absence of smoke has been predetermined; analyzing the visual image by segmenting the visual image into a plurality of regions of interest, and, calculating a smoke index for each of the regions of interest based on a historical intensity of a plurality of pixels within each of the regions of interest; determining the apparent presence of smoke based on the smoke index for the regions of interest by comparing the smoke index to a threshold smoke index level; and, comparing the determination with the predetermined presence or absence of smoke with the image.

The present invention may also be broadly characterized, in a third aspect as providing a system for monitoring a flare burner associated with a processing plant and configured to receive a gas to be combusted, the system configured to determine an apparent presence or absence of smoke from the flare burner, the system including: at least one camera configured to obtain images of the flare burner and an area surrounding the flare burner; and, a controller in communication with the camera and configured to: receive the visual image of the flare burner; and, analyze the visual image by: segmenting the visual image into a plurality of regions of interest; and, calculating a smoke index for each of the regions of interest based on a historical intensity of a plurality of pixels within each of the regions of interest; and, determine the apparent presence of smoke based on the smoke index for the regions of interest by comparing the smoke index to a threshold smoke index level; and, indicate the apparent presence of smoke for the regions of interest when the smoke index is at or above the threshold smoke index level.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, methods for monitoring a flare burner with a camera have been invented which can be used in a system for observing and controlling a flare. According to the various aspects, visual cameras are used to identify the presence or absence of smoke, flame, and/or steam plume. Additionally, a confidence level associated with the indicated presence or absence of smoke, flame, and/or steam is provided. Various embodiments contemplate the use of night vision features of many common camera monitoring systems to assist in indicating the presences or absence of smoke during periods of time when the visual indicators are not accurate or indicated as reliable. The methods and systems measure, minimize, tune, adjust, modulate, or otherwise change the rate of consumption assist fuel gas, purge gas, steam and/or air simultaneously to operate at the edge of (or reasonably near) incipient smoke formation. Finally, the processes and systems may calculate and record various determinations and data calculations, such as the resulting net heating value at the flare tip and maintains operation within regulated limits.

With these general principles in mind, one or more embodiments of the present invention will be described with the understanding that the following description is not intended to be limiting.

Figure 1:
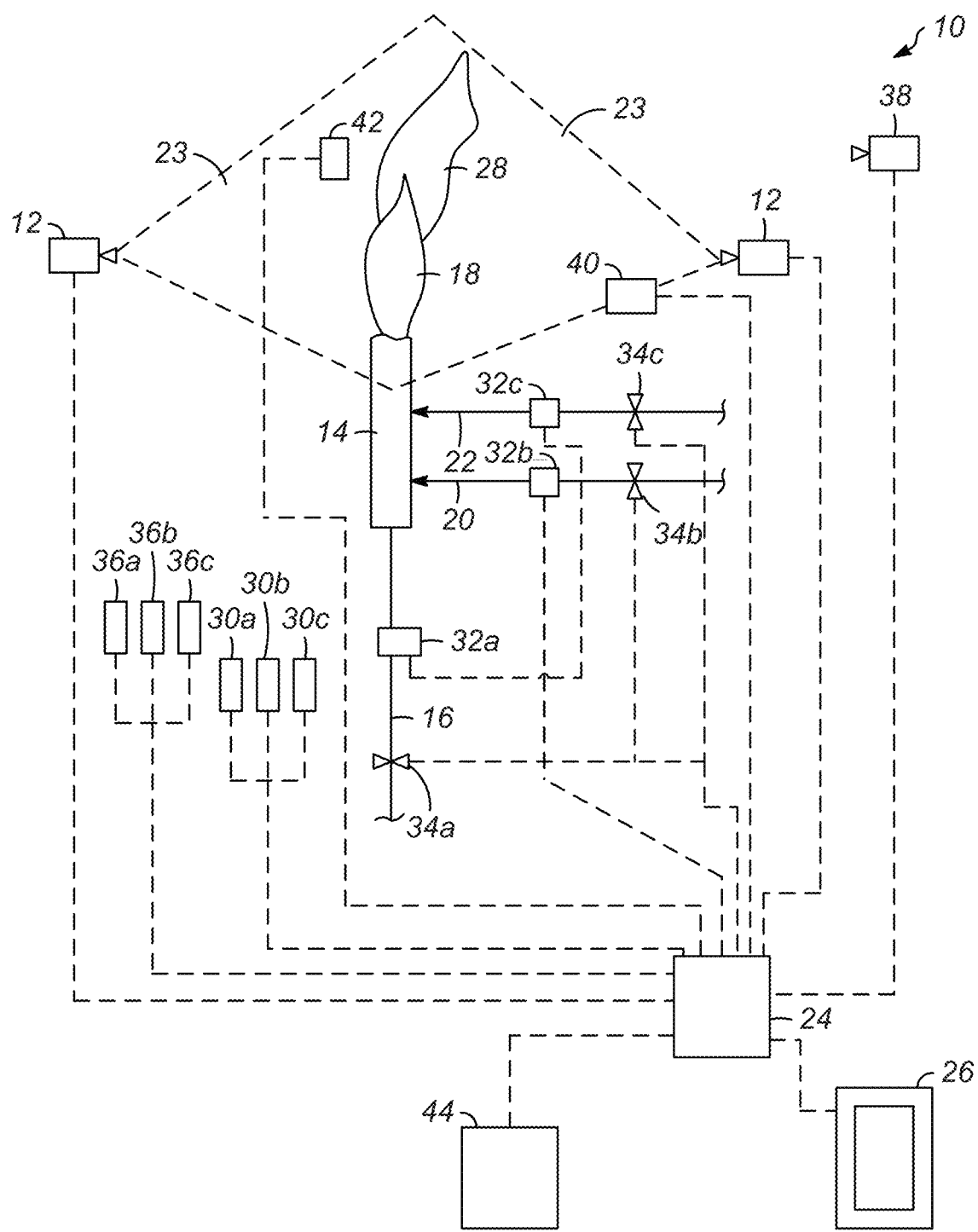
FIG. 1 shows a schematic view of a system according to one or more aspects of the present disclosure.

As shown in FIG. 1, a system 10 according to one or more aspects of the present invention, includes one or more cameras 12 obtaining visual images of a flare burner 14. As is known, the flare burner 14 receives a stream of waste gas 16 to be combusted in a flame 18 at the outlet of the flare burner 14. Additionally, the flare burner may receive a stream of assist gas 20, as well as a stream of steam 22.

The field of view 23 of the cameras 12 preferably include areas around the flare burner 14 and the flame 18. Accordingly, the cameras 12 preferably provide a generally wider field of view. By using a wider field of view and including the area around the flare burner 14 and the flame 18, it is believed to be easier to determine the presence or absence of smoke. While a single camera 12 is the primary approach used by many current flare burner monitoring systems, the use of using multiple cameras 12 allows simultaneous capture of both local images and wider views for signal processing and usable views in cases where wind direction may prevent a certain camera from being able to see the exhaust and smoke plume. The camera 12 may include single lens camera, zooming functions, wide angle high definition (HD) camera and any camera technology available for both optical zoom and digital zooming functions. The human machine interface will allow the operator to adjust their views to better understand the differences between the video images and the analytics images. This will build confidence for the operators that the analytics are providing the correct information.

The cameras 12 are in communication with one or more controllers 24 that each include at least one processor and memory storing computer-readable instructions that, when executed by the at least one processor, cause the one or more controllers 24 to perform a process that may include one or more steps. The controller 24 may be an Application Specific Integrated Circuit (ASIC), an electronic circuit, memory (shared, dedicated, or group) and/or a computer processor (shared, dedicated, or group) that executes one or more executable instructions (e.g., software or firmware programs) stored on the memory, a combinational logic circuit, and/or other suitable components that provide the described functionality. While this disclosure includes particular examples and arrangements of the units, the scope of the present system is not so limited, since other modifications will become apparent to the skilled practitioner. Some or all relevant information may be stored in databases for retrieval by the controller 24 (e.g., as a data storage device and/or one or more non-transitory machine-readable data-storage media storing executable instructions). The controller 24 is further configured to obtain, receive, and/or send information over a communication network (e.g., local communication network, the internet, an intranet). Specifically, the controller 24 may receive signals and/or parameters via the communication network. The controller 24 may display (e.g., in real time, with a short delay, with a long delay) performance information related to the received signals and/or parameters on an interactive display device 26 (i.e., display screen), which may be accessible to an operator or user, either locally or over a communication network like the internet. Additionally, the controller 24 is configured to receive input, via, a keyboard, touch screen, mouse, other device.

For example, the controller 24 may be configured to receive, from one or more cameras 12, data related to images obtained of the flare burner 14 and the area surrounding the flare burner 14. The controller 24 is configured to analyze the obtained images and determine, for example, the likelihood that the flame 18 is producing smoke 28. Based on the determination, the controller 24 may be configured to determine one or more recommended adjustments to one or more process conditions described herein. Additionally, the determination can be outputted to the display device 26. However, the determination by the controller 26 preferably incorporates more information than just the obtained images.

Accordingly, in addition to the camera 12, the controller(s) 24 is in communication with other sensors that provide information or data to the controller to be used when analyzing the images and determining the likelihood that the flare is producing smoke. Such sensors may include, but are not limited to, pressure sensors, differential pressure sensors, other flow sensors, temperature sensors including thermal cameras and skin thermocouples, capacitance sensors, weight sensors, gas chromatographs, moisture sensors, ultrasonic sensors, position sensors, timing sensors, vibration sensors, level sensors, liquid level (hydraulic fluid) sensors, and other sensors commonly found in the refining and petrochemical industry. Further, process laboratory measurements may be taken using gas chromatographs, liquid chromatographs, distillation measurements, octane measurements, and other laboratory measurements. System operational measurements also can be taken to correlate the system operation to the equipment measurements. In addition, sensors may include transmitters and deviation alarms. These sensors may be programmed to set off an alarm, which may be audible and/or visual.

For example, the controller 24 may be in communication with one or more sensors 30a, 30b, 30c for obtaining process condition information associated with the processing plant, such as flow rate, gas composition, temperature, to name a few. Similarly, the controller 24 may be in communication with sensors 32a, 32b, 32c in the lines, for example, providing the streams 16, 20, 22 discussed above. Additionally, the controller 24 may be in communication with valves 34a, 34b, 34c in the lines providing the streams 16, 20, 22 so that the flow of the streams 16, 20, 22 can be adjusted (discussed below). The controller 24 may also be in communication with sensors 36a, 36b, 36c that obtain atmosphere condition information at the flare burner, such as, air temperature, humidity, pressure, wind speed, direction, sun position, rain, etc.

The controller 24 may also be in communication with an ultraviolet (UV) camera 38 that is configured to provide UV images of the flare burner 14. Specifically, the UV camera 38 can be used to provide a number of additional parameters. For instance, a UV camera 38 can easily discriminate against sunlight which might otherwise interfere with measurements. The utility of the UV camera 38 can be enhanced with spectral filters—for instance to determine individual chemical species. For example, sulphur dioxide is an important pollutant. The identification and quantification of this species can be made with well-known UV techniques. Other species can be identified with similar techniques.

The controller 24 may also be in communication with a microphone 40 for providing audio data associated with the flare burner 14. Audio signatures of wind may be included in the raw data and may need to be removed as part of the image processing procedure. After removing wind signatures, the resulting audio may provide an indication that the flare burner 14 is releasing a vapor stream, burning the waste gases, having a steam release, or harmonically oscillating over these various conditions.

The controller 24 may also be in communication with a thermocouple 42 that is configured to measure a temperature a fixed distance from the flare burner 14 or the flame 18. As conditions change at the flare burner 14 tip, the temperature at the thermocouple 42 will change and can alert the operator to focus on the audio and visual signals to determine if changes to the flare operation are required. A temperature signature around the flare burner 14 may also be utilized, for example by measuring temperature on the piping, at the tip of the flare burner 14, and at the specific distance away from the tip that has a definitive temperature change as the vent streams changes to different modes of operation—full event, small flame, or steam purge. This could be some distance away from the flare burner 14 and still have a measurable change.

The network connections depicted include a local area network (LAN) and a wide area network (WAN), and a wireless telecommunications network, but may also include other networks and communication methods. When used in a LAN networking environment, the components of the system 10 may be connected to the LAN through a network interfaces or adapters. When used in a WAN networking environment, the components of the system 10 may be connected through modems or other means for establishing communications over the WAN, such as to an external network (e.g., the Internet). When used in a wireless telecommunications network, the components of the system 10 may include one or more transceivers, digital signal processors, and additional circuitry and software for communicating with each other in the wireless network. It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various components described herein may be configured to communicate using any of these network protocols or technologies.

Accordingly, the controller 24 receives information and data from the various sensors and data collecting devices of the system 10 and is configured to determine one or more of the following: the presence or absence of a flame 18; the presence or absence of smoke plume 28 associated with the flame 18; and the presence or absence of steam plume associated with the flame 18. Additionally, the controller 24 should be configured to indicate and differentiate between smoke and steam.

In addition to the foregoing indications, the controller 24 may also be configured to provide a reliability value indicating a level of confidence in the above listed indications. For example, with a blue sky, a bright red flame, and a dark black soot plume, both the color and brightness contrast starkly with the background and there may be a high level of confidence in indications provided by the controller 24, and thus a high reliability value. However, with a dark night sky, while there may be a high confidence and high reliability value in identifying the presence of flame, there may be a low level of confidence, and thus low reliability value, differentiating between soot and sky background. As a further example, white steam from a flare tip looks dark or like soot, especially when presented on a background of dark, overcast clouds. Accordingly, in such a situation, the controller 24 may provide a low confidence indication in determining whether the steam plume is indeed steam or is soot, smoke. The confidence level may be indicated with a high/low or good/bad indication, with a high, medium, low, or with a numerical scale, for example from 1-10.

In addition, the controller 24 may be in communication with a database 44 so that the controller 24 can store and retrieve information, including, for example, historical data from the various sensors and measuring devices including flare gas, assist fuel gas, assist steam or air flow pressures, rates and compositions; indications of presence or absence of flare pilot or main flame from other devices such as flame scanners, thermocouples or flame ionization rods and/or environmental and weather conditions.

The controller 24 may also record the time (timestamp) of the onset and the stopping of the presence and absence of flame and thereby the duration time/dissipation rate of either or both smoke and/or flame. With the time of start, end and duration of smoke or flame events, the controller 24 will generate a record of events for reporting to local regulators and for calculating whether the operation is in or out of compliance with locally applied regulations. For example, some jurisdictions may limit smoking to no more than five minutes duration in a two-hour time frame. The controller 24 may be programmed to determine whether the operation is within or outside local regulatory limits. In addition, the controller 24 may cause an alarm to be triggered or a report to be automatically generated.

Additionally, as indicated above, the controller 24 is configured to record the determined events in the database 44, along with all of the different variables used and data points collected. These results can be reviewed by an expert to confirm accuracy of the results as discussed below to be used in a machine learning process to train the controller 24 or another controller.

Moreover, based on inputs available in low visibility, low contrast lighting such as at night or in fog or clouds, the controller 24 can access the database 44 to determine the presence or absence of smoke and/or flame based on similar conditions to the current conditions, preferably when confidence or reliability values are low. From the example above where low confidence is given in differentiating between smoke and steam when there is a cloudy or overcast background, when the operating conditions are analyzed by the controller 24 as well and compared with the database 44, the controller 24 may indicate a high confidence in smoke/no smoke based on a comparison of the current variables and historical variables.

The controller 24 may be further configured to adjust process conditions so that the system is operating at a certain set point. For example, the incipient smoke point, the operating condition just before the onset of smoke, is understood in the industry to correspond to the highest destruction efficiency, combustion of the highest percentage of hydrocarbons in and by the flare flame at the point where assist fuel assist gas, steam and/or air are minimized to just lower than the levels which who produce smoke from the flare flame. Accordingly, the controller 24 may be configured to analyze the images and determine what conditions are at or just below the incipient smoke level and adjust various aspects of the processing plant so that the system is at the incipient smoke level. For example, the controller 24 may adjust flow rate with the valves 34a, 34b, 34c.

Figure 2:
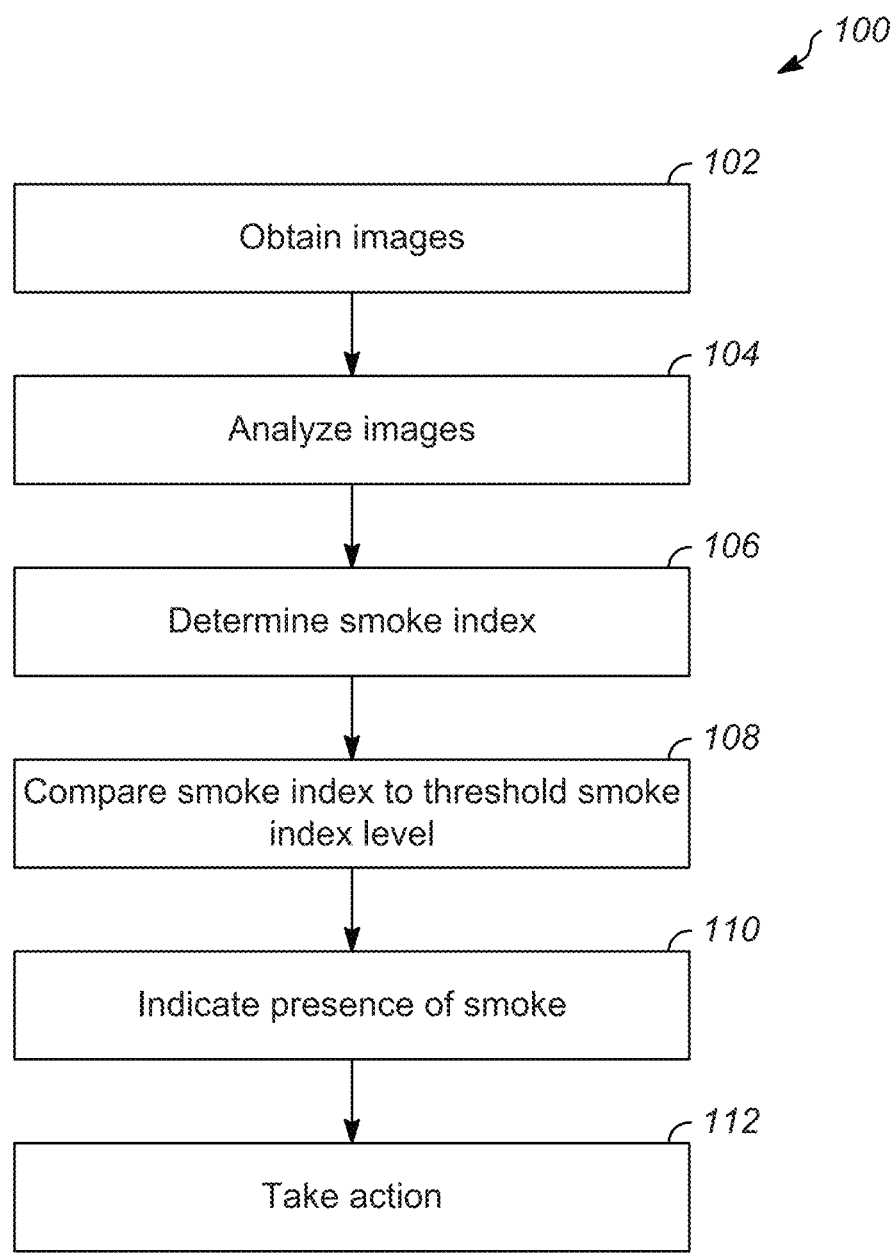
FIG. 2 shows a process flow diagram according to one or more aspects of the present disclosure.

Accordingly, turning to FIG. 2, a process flow diagram depicts various steps of one process 100 that may be implemented by the system 10. Generally, the process 100 includes obtaining images 102, analyze images 104, determining smoke index 106, comparing smoke index to threshold smoke index level 108, indicating the presence of smoke 110, and, taking an action 112.

The step 102 of obtaining a visual image preferably includes obtaining a stream of images/video coming from the camera 12, which is at least one visual/NIR camera, pointed at the flare burner 14. The camera 12 is positioned sufficiently far away from the flare burner 14 to record an image of the flame 18 at the flare burner 14, as well as several flame-lengths of background (BG) around the flame 18. The camera 12 may employ a zoom lens (or multiple cameras with different lenses) to capture large differences in flame 18 size (turn-down ratios $10^5$). Alternatively, a high-resolution camera(s) 12 might be employed with automatically controlled regions of interest (discussed below) and/or resolution(s) (by combining pixels). One reason is believed to be beneficial to use variable length scales is that smoke dissipation can be expected to occur on similar length scales to the flame 18 length.

In some situations, it is advantageous to use more than one camera 12. For example, depending on wind conditions, a camera 12 may be poorly situated. If the smoke plume 28 is blowing away from the camera 12, the plume 28 may be partially obscured by the flame 18 or the flare burner 14, or the opacity of the plume 28 may be artificially magnified because the camera 12 sees an artificially increased optical path length. In a preferred embodiment, two or more cameras 12 are employed and placed at regular intervals, with the two cameras 12 separated by 90 degrees. The processor 24 can determine which camera 12 has the best cross section view of the plume 28 and this camera 12 is selected for analyzing the images from same. Alternatively, cameras 12 may be used together to put calculated variables into absolute distance scales. For instance, an absolute distance to where the smoke becomes non-visible could be determined and possibly controlled.

In the step 104 of analyzing the images, the controller 24 performs an image analysis in order to determine the presence or absence of smoke 28 at the flare burner 14.

First, the image analysis may optionally include performing an image segmentation (for example color segmentation) and determine where the flame 18 is and where the tip of the flare burner 14 is. Then, the image analysis defines regions of interest (ROIs) or boxes to divide the image into regions of smoke/BG/flame/flare/clouds. This definition can happen in multiple ways: static segmentation of the image into reasonably-sized ROIs; dynamic segmentation of the image into ROIs centered around and moving with the current flame-tip (this is advantageous to minimize computing power required as the smoke plume is expected to extend in the same direction roughly as the flame); or dynamic segmentation according to image segments like smoke, flame, sky, clouds, steam, etc.

Subsequently, for every region of interest (ROI), the image analysis step 104 includes determining a background image. This background has the effects of smoke minimized. In an exemplary simplest embodiment, the following procedure is performed. First, the color image is reduced to an intensity scale and the color image is intended to include black/white/grey images and intensities. This can be done by creating a linear or non-linear combination of the color channels, or simply by taking a single channel Based on experimental results, using the blue channel of an RGB (red, green, and blue) representation removes smoke from the image in an acceptable manner. Then, a maximum intensity value of each pixel (or group of pixels, depending on level of analysis performed) in said intensity representation is made using the last X number frames. The value for X can be adjusted and depends, in part, on the speed of changes in the flame and background. Based on experimental results, it was determined that at X=30 to 50 frames-per-second (fps) sufficiently removes smoke but not clouds. One of ordinary skill in the art will appreciate and understand that other numbers of previous images may be used, and that the previous images need immediately precede the current image. Additionally, instead of the maximum, another value could be chosen (e.g. the median, the most populated, the value 1 sigma above the mean, and others). Moreover, if the background (i.e. the clouds) changes too quickly, this background determination can happen in a moving ROI that moves with the background Affine transformations of the clouds might be included to account for shape changes. The motion of the clouds can be calculated independently of the smoke motion by looking at the part of the image in which smoke is not present. Finally, for well-behaved background, the background determination may also be accomplished through the use of databases (e.g. Clear sky library) or with the International Commission on Illumination (CIE) standard calculation for sky intensity based on Earth's position, time, and sighting direction.

After the image analysis, the process includes the step 106 of calculating a smoke-index for each ROI. In in exemplary calculation, this is determined by Equation (1):

$$SI=100\%*(1-INTnow/INTbackground). \quad (1)$$

In other words, the smoke-index is a percentage-level number that is equal to one hundred times one minus the summed intensity of the current image divided by the summed intensity of the background ROI. A low level means no smoke. It is also contemplated that smoke-index is calculated differently (e.g. the difference of intensity values (background−current) normalized to the background intensity).

In order to reduce the contribution of noise, the background and current intensity can be adequately filtered: e.g. by fitting a smooth polynomial. However, note that the size of the ROI has to be chosen well. It is believed that this calculation does not work well on a single pixel basis—a single pixel or regions which are too small are too sensitive to such things as small cloud motions. Thus, it has been determined that ROI sizes from ¼ to 1 flame-area size seem to work well to filter out small scale variations.

Due to non-ideal-camera artefacts, it may be useful to make corrections to the above-mentioned smoke-index calculation. That is, over X frames it has been found frame-to-frame intensity variations leads to calculations of a non-zero raw smoke index even in regions with no smoke. To correct for this—the average or maximum raw smoke index can be subtracted from all regions to give a corrected smoke index. In this way, numbers near zero correspond to regions with no smoke.

Figure 3:
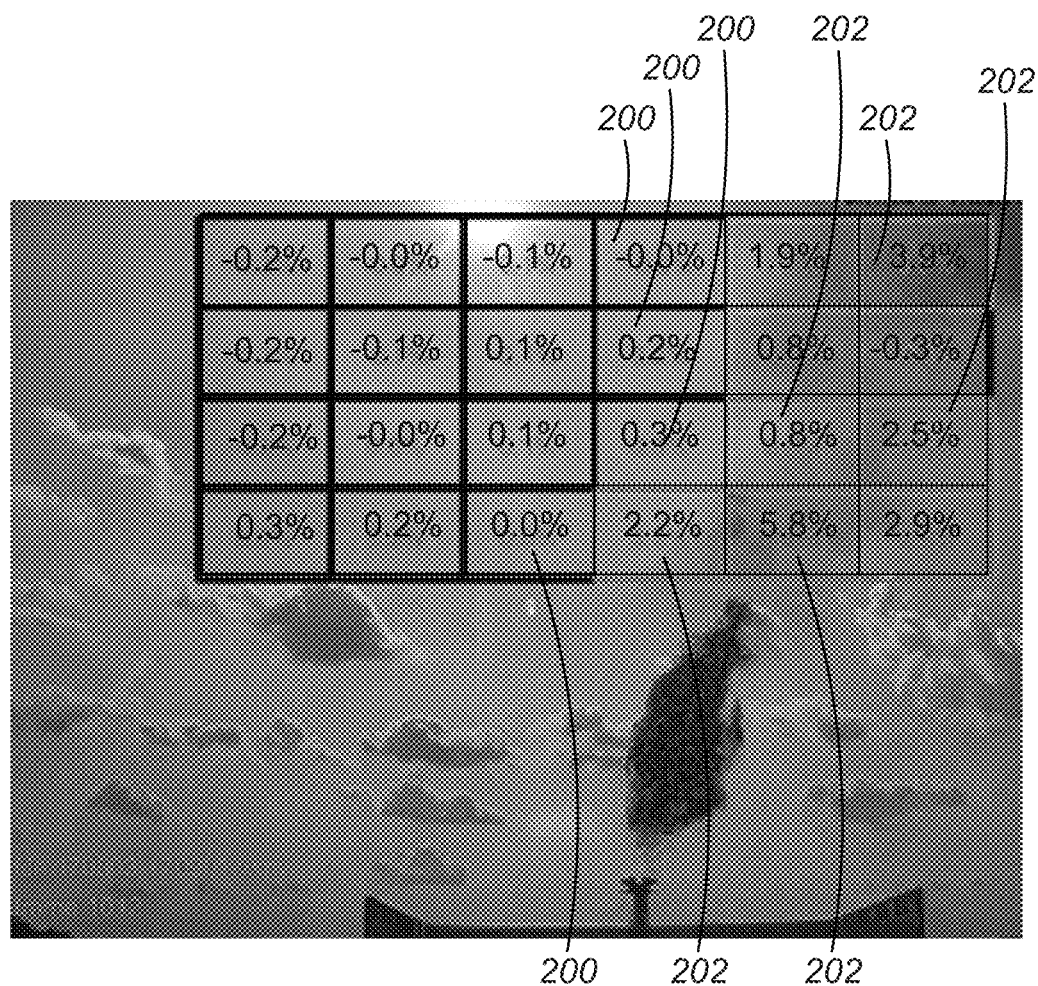
FIG. 3 shows an analyzed image according to one or more aspects of the present disclosure.

Based on the foregoing steps, every ROI can be assigned a value for the smoking-index. These specific smoke index levels can be displayed on the display screen with the image of the flare burner, such as shown in FIG. 3, in which a first set of ROIs 200 have no smoke, and a second set have been determined to have smoke 202.

One of the ROIs or a defined subset of the ROIs will then be chosen to perform the step 108 of comparing those index numbers with a threshold value smoke index. The threshold value smoke index is threshold smoke index is the minimum index a trained observer would indicate that smoke was present and can be a fluid value. For example, the database can be consulted for determining the threshold value smoke index. Based on the comparison, the process includes the step 110 of providing an indication of the presence or absence of smoke based on the comparison of the index numbers with the threshold values.

Choosing the correct ROI(s) can be based on geometrical information (flame direction) and/or on further segmentation/cross correlation with other parameters such as absolute intensity/entropy/frequency content/etc. It is known that smoke levels will become smaller as the plume 28 moves further from the flame 18. It is believed to be advantageous to not control on a maximum smoke level, but on a smoke level a fixed distance, or a fixed number of flame lengths away from the tip of the flare burner 14. Alternatively, as discussed above, it may be desirable to determine at what smoke index the smoke is no longer deemed to be visible and then to control the flare burner 14 to produce that smoke index at a predetermined distance from the flare. Of course, the smoke-index number can change rapidly and randomly therefore it is envisioned that considerable time smoothing will have to be employed.

A confidence number, also determined by the controller 24, for the overall smoke-index provides an indication of how reliable the obtained smoke index values are. As noted above, when the confidence levels are below a certain level, the step of determining the smoke index 106 can apply a greater weight to non-visual based variables to provide a more accurate determination. Additionally, the analysis may include comparing current conditions with similar conditions in the database and relying the determination in the database to indicate whether or not smoke is present.

In addition, the present invention also contemplates using a machine learning/neural network system to determine smoke visibility. Thus, the images used in the first step 102 of the process may not be real time images but representative images and video samples of flares. Some of the images exhibit a low level of visible smoking, as well as images have no visible smoke, and those that include high levels of smoke. It is believed to be advantageous to have a frame rate fast enough that smoke cannot transition between non-adjacent regions of interest between frames, but slow enough that there is not a large overhead of non-relevant information to process. In experiments, rates between 5 and 30 frames per second are preferred and about 10 fps is most preferred ideal.

Once again, the region of interest (ROI) with respect to the flare burner are defined in the various images. Again, it is preferred that the image is not just of the flare burner and/or the flame, but of three to five times the maximum expected flame length. The regions of interest may be fixed with respect to the camera field of view, or they can translate with the flare. Translating regions of interest may be advantageous for reducing the required computing power, or for eliminating regions where calculations are difficult, such as where the sun saturates the image. The regions of interest cannot be too small or too large. Too small and the movement of clouds will affect the measurements, and too large smoke which does not occupy the entire ROI will not have enough of an impact on the statistics for the entire region of interest. In practice, regions of interest of 2500 to 10000 pixels are possible. Also, it is believed to be preferred to have 20 to 50 regions of interest in each frame as the smoke determination is dynamic with this technique. At least a third of the regions of interest should represent background regions with no smoke. The other regions can be compared to these.

Once again, for each ROI, a number of metrics are calculated. These calculations can be based on the current frame, such as average standard deviation of intensity for each of the color channels. Also important are the same quantities in the maximum pixel representation. In this training stage, many different inputs are useful. As a result of the training, it will become evident which inputs are the most useful and which are redundant. However, each region cannot be considered independently, it is important to consider the information from all the ROIs in a frame. As mentioned previously, we will assume that at least a third of the regions represent background regions.

Important information can also be determined from the transition of smoke from one region of interest to the next. It is believed that results will be improved if it is known that smoke is most likely to occur in the regions of interest nearest the flame and can only propagate to adjacent ROIs. This can be used to eliminate many false positives, or Markov models can be applied when constructing the neural network.

Using common visual signals machine learning can develop a library of shapes, colors, intensities, and dynamic signatures of various flaring situations. Using this library of information, the system is able to identify normal, abnormal, and alternate flare situations and provide visual indications and the best recommendations and actions for an operator of the flare system.

Some key features include use of general-purpose cameras which result in a low cost. Also advanced video analysis such as background image cleaning for atmospheric conditions including high sunlight, low light, humidity, and background gas issues is used to enhance the models used to deliver the recommendations.

Operating instructions are provided with clear indicators of flare system performance. This will include color coded graphics for the operator to immediately understand the impact of changes being considered to improve the performance of their flare system. This will enable the operator to make the best decision when they are faced with adjusting the operation of the flare system.

Figure 4:
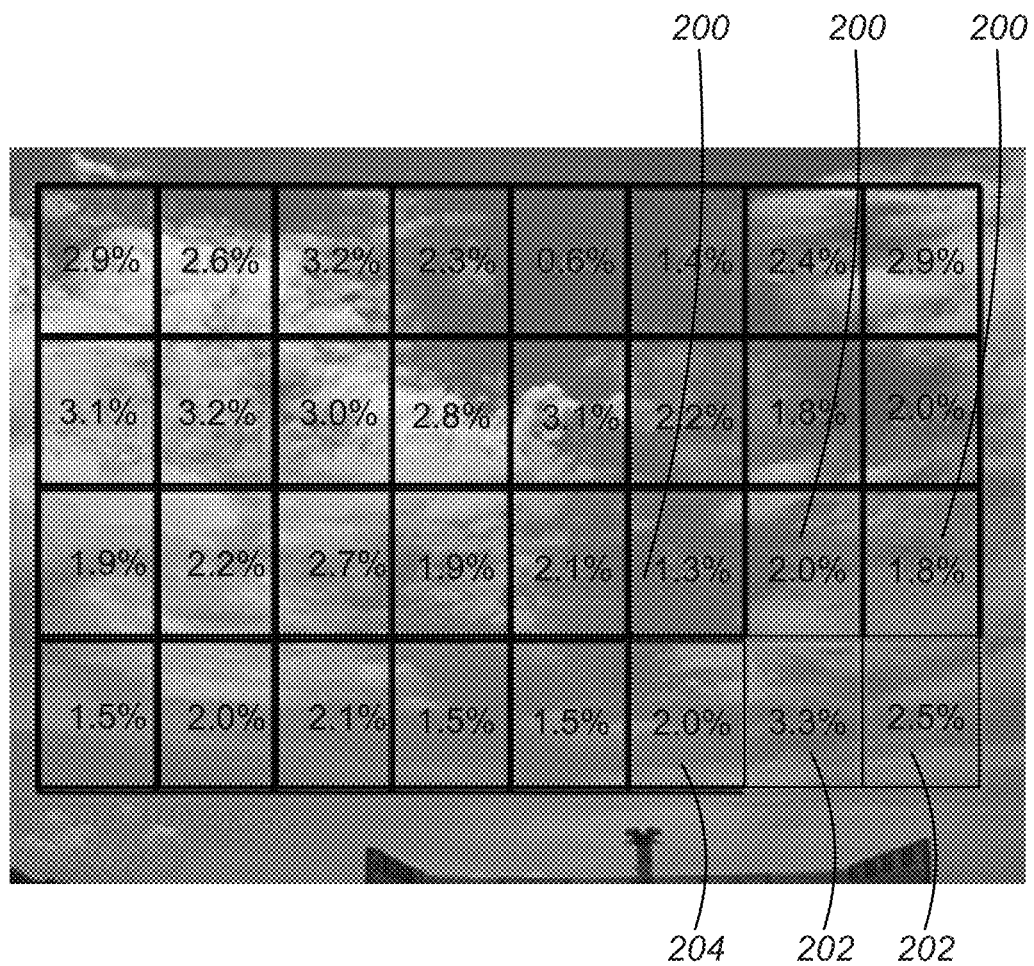
FIG. 4 shows another analyzed image according to one or more aspects of the present disclosure.

As is usual for this type of neural network, the system will be trained, and the results of the training shall be encoded into the production system. To do this training, a training data set must be created. The possible classifications for each ROI should be 'no-smoke' 200, 'smoke' 202, and 'unknown' 204. See FIG. 4. The unknown ROIs 204 should be weighted accordingly when determining the merit figures for the neural network. For this image shown in FIG. 4, the flare being tested is not in the field of view. In FIG. 4, two ROIs with smoke 202 are indicated, and one ROI with unknown 204 is indicated. This determination is not completely evident in a single frame; but is more evident as the video is played back as the smoke can be seen to move against the background. It can also be seen that raw opacity, calculated with a current frame comparison of blue intensity to a maximum pixel representation over the last, for example, 30 frames, which is displayed in green text, is not always an acceptable indicator of the presence of smoke.

Figure 5:
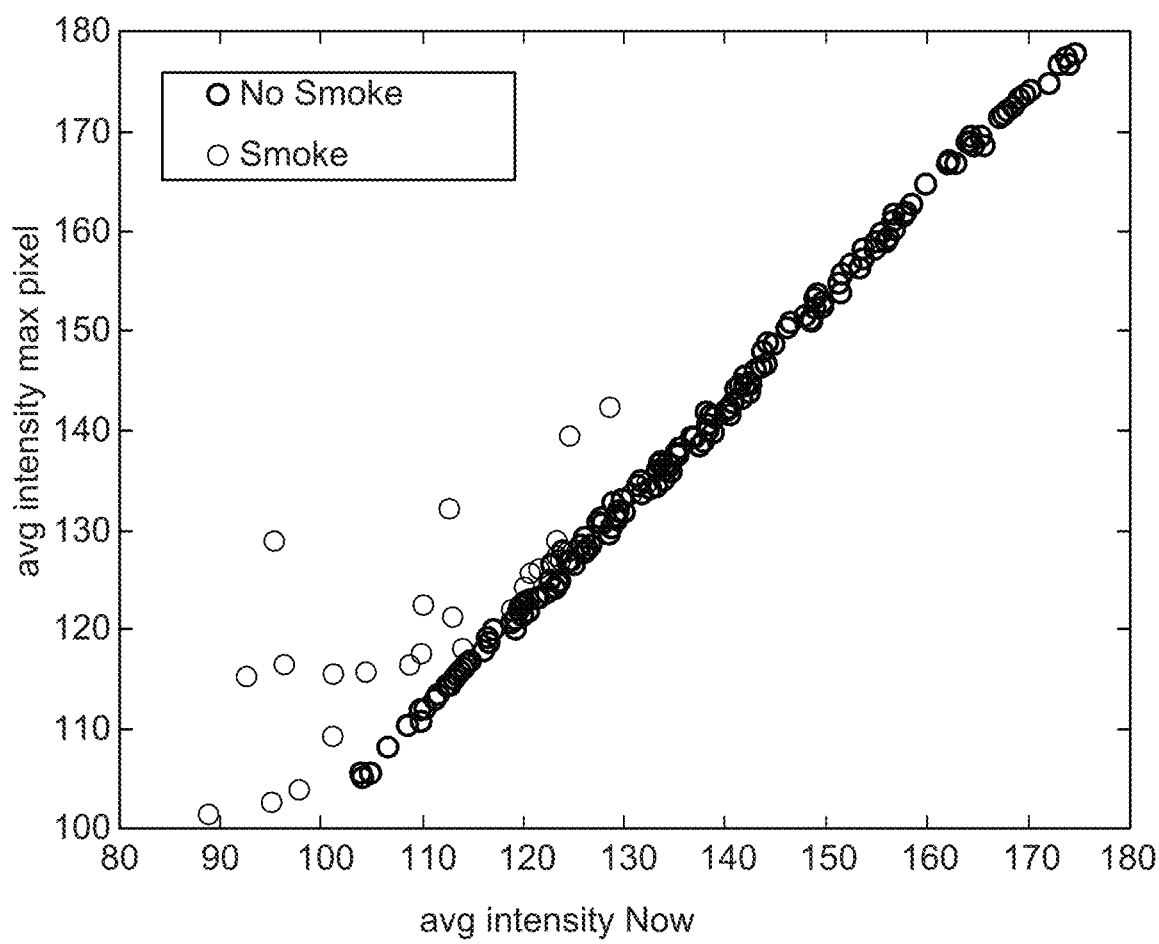
FIG. 5 shows a graphical comparison according to one or more aspects of the present disclosure.
Figure 6:
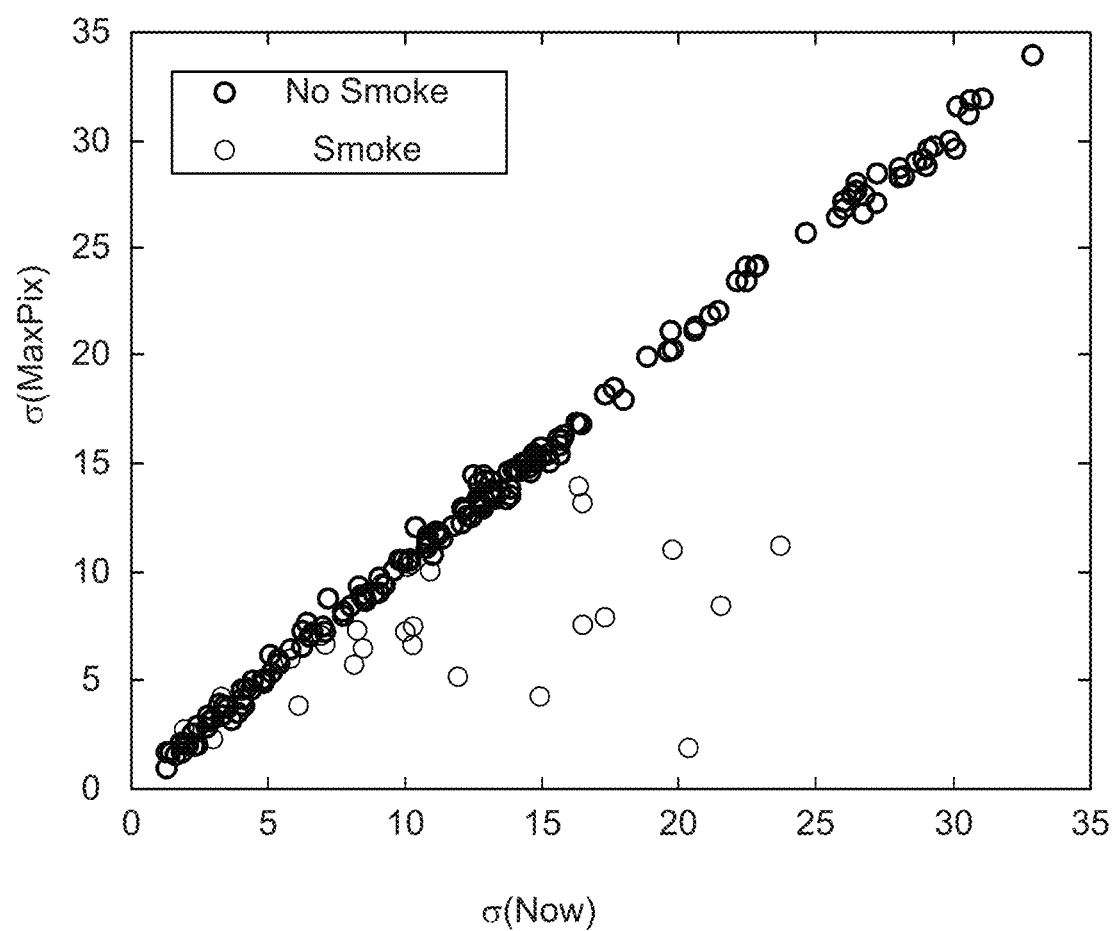
FIG. 6 shows a graphical comparison according to one or more aspects of the present disclosure.

FIGS. 5 and 6 show four variables calculated from these regions of interest along with similar calculations from 10 other video clips. These variables were input into a MatLab neural network Pattern Recognition tool (nprtool) which provided a useable model and showing proof of concept that the smoke index can be determined by comparison with a historical value (average (FIG. 5) or standard deviation (FIG. 6)).

After the neural network has been trained, the network can be taken and configured as part of the controller 24 to output a smoke indication, along with a measurement uncertainty for the system 10.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for determining an apparent presence or absence of smoke from a flare burner associated with a processing plant, the process comprising a) obtaining a visual image of the flare burner and an area surrounding the flare burner; b) analyzing the visual image by segmenting the visual image into a plurality of regions of interest; and, calculating a smoke index for each of the regions of interest based on a historical intensity of a plurality of pixels within each of the regions of interest; and, c) determining the apparent presence of smoke based on the smoke index for the regions of interest by comparing the smoke index to a threshold smoke index level; and, d) indicating the apparent presence of smoke for the regions of interest when the smoke index is at or above the threshold smoke index level. An embodiment of the invention is one, any or all of prior embodiments in this paragraph up through the first embodiment in this paragraph, wherein the smoke index of the pixels are calculated by determining an intensity value for one or more pixels in a particular region of interest by subtracting a background intensity value, wherein the background intensity value of each pixel comprises a maximum intensity value for that pixel from a series of visual images. An embodiment of the invention is one, any or all of prior embodiments in this paragraph up through the first embodiment in this paragraph, wherein the smoke index is based on an opacity determination. An embodiment of the invention is one, any or all of prior embodiments in this paragraph up through the first embodiment in this paragraph, wherein the smoke index of each region of interest is calculated with the following equation, 100%*(1−INTnow/INTbackground), wherein INTnow represents an average intensity value of one or more pixels in a particular region of interest, and wherein INTbackground represents a maximum intensity value for the one or more pixels in the particular region of interest determined from a series of visual images. An embodiment of the invention is one, any or all of prior embodiments in this paragraph up through the first embodiment in this paragraph, wherein the series of visual images comprises between 20 to 70 frames preceding the visual image. An embodiment of the invention is one, any or all of prior embodiments in this paragraph up through the first embodiment in this paragraph, wherein the intensity value is a color intensity value. An embodiment of the invention is one, any or all of prior embodiments in this paragraph up through the first embodiment in this paragraph, wherein the regions of interest are moving in relation to the flare burner. An embodiment of the invention is one, any or all of prior embodiments in this paragraph up through the first embodiment in this paragraph, wherein the regions of interest are static in relation to the flare burner. An embodiment of the invention is one, any or all of prior embodiments in this paragraph up through the first embodiment in this paragraph, further comprising adjusting at least one process condition of the processing plant based on a difference between the smoke index is at or above the threshold smoke index level; and, repeating steps a)-c). An embodiment of the invention is one, any or all of prior embodiments in this paragraph up through the first embodiment in this paragraph, wherein the at least one process condition is adjusted to maintain the smoke index at the predetermined set point. An embodiment of the invention is one, any or all of prior embodiments in this paragraph up through the first embodiment in this paragraph, wherein steps a)-c) are repeated until the smoke index reaches a predetermined level. An embodiment of the invention is one, any or all of prior embodiments in this paragraph up through the first embodiment in this paragraph, further comprising calculating a reliability value for each smoke index calculated. An embodiment of the invention is one, any or all of prior embodiments in this paragraph up through the first embodiment in this paragraph, further comprising increasing a weighting to non-camera based values used for determining the smoke index based on the reliability values. An embodiment of the invention is one, any or all of prior embodiments in this paragraph up through the first embodiment in this paragraph, further comprising obtaining a current process condition information of the processing plant; and, when a number of the calculated smoke indexes with a reliability value above a predetermined level is below a minimum amount, determining the apparent presence by comparing the current process condition information with a database having process condition data and apparent smoke probability associated with the process condition data. An embodiment of the invention is one, any or all of prior embodiments in this paragraph up through the first embodiment in this paragraph, further composing obtaining a current atmospheric condition information at the flare burner; and, when a number of the calculated smoke indexes with a reliability value above a predetermined level is below a minimum amount, determining the apparent presence by comparing the atmospheric condition information with the database, wherein the database further comprises having atmospheric condition data and apparent smoke probability associated with the atmospheric condition data. An embodiment of the invention is one, any or all of prior embodiments in this paragraph up through the first embodiment in this paragraph, further comprising obtaining an audio signature of the flare burner corresponding to the visual image, and wherein the smoke index for each regions of interest is calculated based on the audio signature. An embodiment of the invention is one, any or all of prior embodiments in this paragraph up through the first embodiment in this paragraph, further comprising obtaining an UV image of the flare burner corresponding to the visual image, and wherein the smoke index for each regions of interest is calculated based on the UV image. An embodiment of the invention is one, any or all of prior embodiments in this paragraph up through the first embodiment in this paragraph, further comprising obtaining a temperature at a predetermined position spaced from the flare burner corresponding to the visual image; comparing the temperature to a threshold temperature; and, performing an action when the temperature meets or passes the threshold temperature.

A second embodiment of the invention is a process for determining an apparent presence or absence of smoke from a flare burner associated with a processing plant, the process comprising obtaining a plurality of visual images of the flare burner and an area surrounding the flare burner, wherein the plurality includes an image with no smoke and an image with smoke, and wherein the presence or absence of smoke has been predetermined; analyzing the visual image by segmenting the visual image into a plurality of regions of interest; and, calculating a smoke index for each of the regions of interest based on a historical intensity of a plurality of pixels within each of the regions of interest; and, determining the apparent presence of smoke based on the smoke index for the regions of interest by comparing the smoke index to a threshold smoke index level; and, comparing the determination with the predetermined presence or absence of smoke with the image.

A third embodiment of the invention is a system for process for monitoring a flare burner associated with a processing plant and configured to receive a gas to be combusted, the system configured to determine an apparent presence or absence of smoke from the flare burner, the system comprising at least one camera configured to obtain images of the flare burner and an area surrounding the flare burner; and, a controller in communication with the camera and configured to receive the visual image of the flare burner; and, analyze the visual image by segmenting the visual image into a plurality of regions of interest; and, calculating a smoke index for each of the regions of interest based on a historical intensity of a plurality of pixels within each of the regions of interest; determine the apparent presence of smoke based on the smoke index for the regions of interest by comparing the smoke index to a threshold smoke index level; and, indicate the apparent presence of smoke for the regions of interest when the smoke index is at or above the threshold smoke index level.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for determining an apparent presence or absence of smoke from a flare burner associated with a processing plant, the process comprising:
   a) obtaining a visual image of the flare burner and an area surrounding the flare burner;
   b) analyzing the visual image by:
      segmenting the visual image into a plurality of regions of interest; and
      calculating a smoke index for each of the regions of interest based on a historical intensity of a plurality of pixels within each of the regions of interest; and
   c) determining the apparent presence of smoke based on the smoke index for the regions of interest by comparing the smoke index to a threshold smoke index level;
   d) indicating the apparent presence of smoke for the regions of interest when the smoke index is at or above the threshold smoke index level,
   e) adjusting at least one process condition of the processing plant based on a difference between the smoke index at or above the threshold smoke index level; and
   f) repeating steps a)-c).

2. The process of claim 1, wherein the smoke index is calculated by:
   determining an intensity value for one or more of the plurality of pixels in a particular region of interest by subtracting a background intensity value,
   wherein the background intensity value of each of the plurality of pixels comprises a maximum intensity value for that pixel determined from a series of visual images.

3. The process of claim 1, wherein the smoke index is based on an opacity determination.

4. The process of claim 3, wherein the smoke index of each region of interest is calculated using an equation comprising:

$$100\% * (1 - INTnow / INTbackground),$$

wherein INTnow represents an average intensity value of one or more pixels in a particular region of interest, and wherein INTbackground represents a maximum intensity value for the one or more pixels in the particular region of interest determined from a series of visual images.

5. The process of claim 4, wherein the series of visual images comprises between 20 to 70 frames preceding the visual image.

6. The process of claim 2, wherein the intensity value is a color intensity value.

7. The process of claim 1, wherein the plurality of regions of interest are moving in relation to the flare burner.

8. The process of claim 1, wherein the plurality of regions of interest are static in relation to the flare burner.

9. The process of claim 1, wherein the at least one process condition is adjusted to maintain the smoke index at a predetermined set point.

10. The process of claim 1, wherein steps a)-c) are repeated until the smoke index reaches a predetermined level.

11. The process of claim 1, further comprising:
calculating a reliability value for each smoke index calculated.

12. The process of claim 11, wherein the step of indicating the apparent presence of smoke for the regions of interest utilizes at least one non-camera based value, and wherein in the process further comprises:
increasing a weighting to the non-camera based value used for indicating the apparent presence of smoke based on the reliability values.

13. The process of claim 12, wherein the non-camera based value comprises a
current process condition information of the processing plant.

14. The process of claim 12, wherein the non-camera based value comprises a current atmospheric condition information at the flare burner.

15. The process of claim 1, further comprising:
obtaining an audio signature of the flare burner corresponding to the visual image, and wherein the smoke index for each regions of interest is calculated based on the audio signature.

16. The process of claim 1, further comprising:
obtaining an UV image of the flare burner corresponding to the visual image, and wherein the smoke index for each regions of interest is calculated based on the UV image.

17. The process of claim 1, further comprising:
obtaining a temperature at a predetermined position spaced from the flare burner corresponding to the visual image;
comparing the temperature to a threshold temperature; and
performing an action when the temperature meets or passes the threshold temperature.

18. A process for determining an apparent presence or absence of smoke from a flare burner associated with a processing plant, the process comprising:
obtaining a plurality of visual images of the flare burner and an area surrounding the flare burner, wherein the plurality includes an image with no smoke and an image with smoke, and wherein the presence or absence of smoke has been predetermined;
analyzing each visual image by:
segmenting the visual image into a plurality of regions of interest, wherein the plurality of regions of interest are static in relation to the flare burner; and
calculating a smoke index for each of the regions of interest based on a historical intensity of a plurality of pixels within each of the regions of interest; and
determining the apparent presence of smoke based on the smoke index for the regions of interest by comparing the smoke index to a threshold smoke index level which comprises a minimum index for the images herein the presence of smoke has been predetermined; and
comparing the determination with the predetermined presence or absence of smoke with the visual image.

19. A system for process for monitoring a flare burner associated with a processing plant and configured to receive a gas to be combusted, the system configured to determine an apparent presence or absence of smoke from the flare burner, the system comprising:
at least one camera configured to obtain visual images of the flare burner and an area surrounding the flare burner; and
a controller in communication with the camera and configured to:
receive the visual images of the flare burner; and
analyze each visual image by:
segmenting the visual image into a plurality of regions of interest; and,
calculating a smoke index for each of the regions of interest based on a historical intensity of a plurality of pixels within each of the regions of interest by determining an intensity value for one or more of the plurality of pixels in a particular region of interest by subtracting a background intensity value, wherein the intensity value is a color intensity value, and wherein the background intensity value of each of the plurality of pixels comprises a maximum intensity value for that pixel determined from a series of visual images; and
determine the apparent presence of smoke based on the smoke index for the regions of interest by comparing the smoke index to a threshold smoke index level; and
indicate the apparent presence of smoke for the regions of interest when the smoke index is at or above the threshold smoke index level.

* * * * *